United States Patent
Huang

(10) Patent No.: US 10,234,967 B2
(45) Date of Patent: Mar. 19, 2019

(54) TOUCH PAD ADJUSTMENT

(71) Applicant: HEWLETT-PACKARD DEVELOPMENT COMPANY, L.P., Houston, TX (US)

(72) Inventor: Chin-Hung Huang, Taipei (TW)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 16 days.

(21) Appl. No.: 15/516,461

(22) PCT Filed: Nov. 10, 2014

(86) PCT No.: PCT/US2014/064737
§ 371 (c)(1),
(2) Date: Apr. 3, 2017

(87) PCT Pub. No.: WO2016/076820
PCT Pub. Date: May 19, 2016

(65) Prior Publication Data
US 2018/0232072 A1    Aug. 16, 2018

(51) Int. Cl.
*G06F 3/0354* (2013.01)
*G06F 1/16* (2006.01)
*G06F 3/01* (2006.01)

(52) U.S. Cl.
CPC .......... *G06F 3/03547* (2013.01); *G06F 1/169* (2013.01); *G06F 1/1684* (2013.01); *G06F 3/016* (2013.01)

(58) Field of Classification Search
CPC ........ G06F 1/169; G06F 3/03547; F06F 3/03; H01H 13/14
See application file for complete search history.

(56) References Cited

U.S. PATENT DOCUMENTS

| | | | |
|---|---|---|---|
| 6,096,984 A * | 8/2000 | Howell | G06F 1/1616 178/18.01 |
| 6,281,887 B1 | 8/2001 | Wang | |
| 7,109,972 B2 | 9/2006 | Fu | |
| 7,548,232 B2 | 6/2009 | Shahoian et al. | |
| 8,537,541 B2 | 9/2013 | Zhang | |
| 8,749,493 B2 | 6/2014 | Zadesky et al. | |
| 9,030,839 B2 * | 5/2015 | Leggett | G06F 1/182 345/173 |

(Continued)

FOREIGN PATENT DOCUMENTS

| KR | 10-2000-0021840 A | 4/2000 |
|---|---|---|
| KR | 10-2013-0009221 A | 1/2013 |

(Continued)

*Primary Examiner* — Lunyi Lao
*Assistant Examiner* — Jarurat Suteerawongsa
(74) *Attorney, Agent, or Firm* — HPI Patent Department

(57) ABSTRACT

Examples of adjustment of a touch pad are disclosed herein. One example includes a touch pad adjacent an edge of an opening defined by a housing of an electronic device and a bracket to secure a first side of the touch pad to the housing adjacent the edge. This example also includes an adjustment mechanism to selectively move a first corner and a second corner of the touch pad that are opposite the first side in either a direction toward or away from a front surface of the housing so that the first and second corners are substantially flush will the adjacent edge.

14 Claims, 13 Drawing Sheets

(56) References Cited

U.S. PATENT DOCUMENTS

| | | |
|---|---|---|
| 2010/0103129 A1 | 4/2010 | Ling et al. |
| 2013/0027864 A1 | 1/2013 | Wei |
| 2013/0050122 A1 | 2/2013 | Kang et al. |
| 2014/0116865 A1* | 5/2014 | Leong .................. G06F 3/0202 200/344 |
| 2014/0139442 A1 | 5/2014 | Clayton et al. |
| 2014/0211396 A1 | 7/2014 | Shiroishi |
| 2015/0212589 A1 | 7/2015 | Hatanaka et al. |

FOREIGN PATENT DOCUMENTS

| | | |
|---|---|---|
| WO | WO-02073587 | 9/2002 |
| WO | WO-2011/071837 A2 | 6/2011 |
| WO | WO-2014034067 A1 | 3/2014 |

* cited by examiner

TOUCH PAD ADJUSTMENT

BACKGROUND

Touch pads may be used in electronic devices to input data and for navigation of menus. Touch pads may also detect end user gestures, such as the sliding of a finger along the touch pad, and translate such gestures into operations. For example, the sliding of a finger along the touch pad may be translated into the movement of a cursor on a screen of the electronic device.

BRIEF DESCRIPTION OF THE DRAWINGS

The following detailed description references the drawings, wherein.

DETAILED DESCRIPTION

An electronic device may include a touch pad to input data, navigate menus and/or detect user gestures during use of the electronic device. The electronic device may include a housing that defines an opening into which the touch pad is placed to connect the touch pad to the electronic device.

The touch pad may include corners that are adjacent an edge of the opening defined by the housing. Steps may be created between some of these corners of the touch pad and the adjacent edge. These steps may be perceived by some electronic device users as an indication of low quality. Some electronic device users may also or alternatively find such steps to be aesthetically displeasing. Such steps may additionally or alternatively be uncomfortable to some electronic device users when they encounter them during use of a touch pad.

Examples directed to helping to minimize these steps between the corners of a touch pad and the adjacent edge of an opening of an electronic device are shown in FIGS. 1-14. These examples attempt to address the above-described technical challenges associated with such steps by allowing the corners of a touch pad that are creating these steps to be selectively moved in either a direction toward or away from a first surface of the housing so that these corners may be made substantially flush with the adjacent edge of the housing.

As used herein, the term "electronic device" represents, but is not necessarily limited to, a notebook computer, computing device accessory such as a discrete keyboard, tablet, phone, personal digital assistant, audio player, wearable device, or combination thereof. As used herein, the terms "include", "includes", "including", "have", "has", "having" and variations thereof, mean the same as the terms "comprise", "comprises", and "comprising", or appropriate variations thereof.

Figure 1:
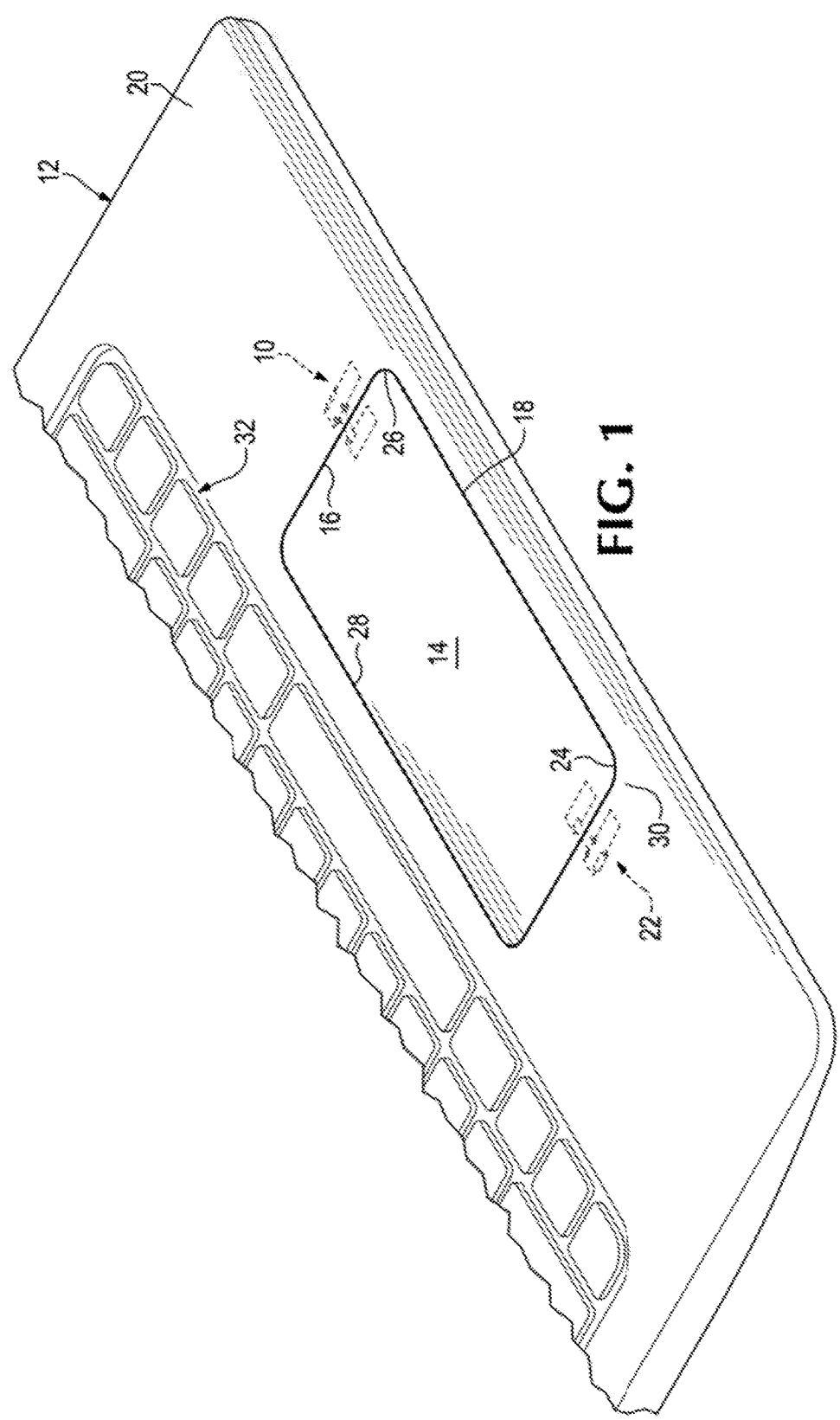
FIG. 1 is an example of an apparatus to use in an electronic device.

An example of an apparatus 10 to use in an electronic device 12 is shown in FIG. 1. As can be seen in FIG. 1, electronic device 12 includes a touch pad 14 adjacent an edge 16 of an opening 18 defined by a housing 20 of electronic device 12. As can also be seen in FIG. 1, apparatus 10 additionally includes an adjustment mechanism 22 to selectively move a first corner 24 and a second corner 26 of touch pad 14 that are opposite first side 28 of touch pad 14 toward and away from front surface 30 of housing 20 so that respective first end second corners 24 and 26 are substantially flush with adjacent edge 16, as discussed more fully below. As can additionally be seen in FIG. 1, electronic device 12 includes a keyboard 32 to input alphanumeric characters, as well as symbols and commands. Although not shown in FIG. 1, electronic device 12 may also include other components as well, such as a display, memory, input and output connectors, etc.

Figure 2:
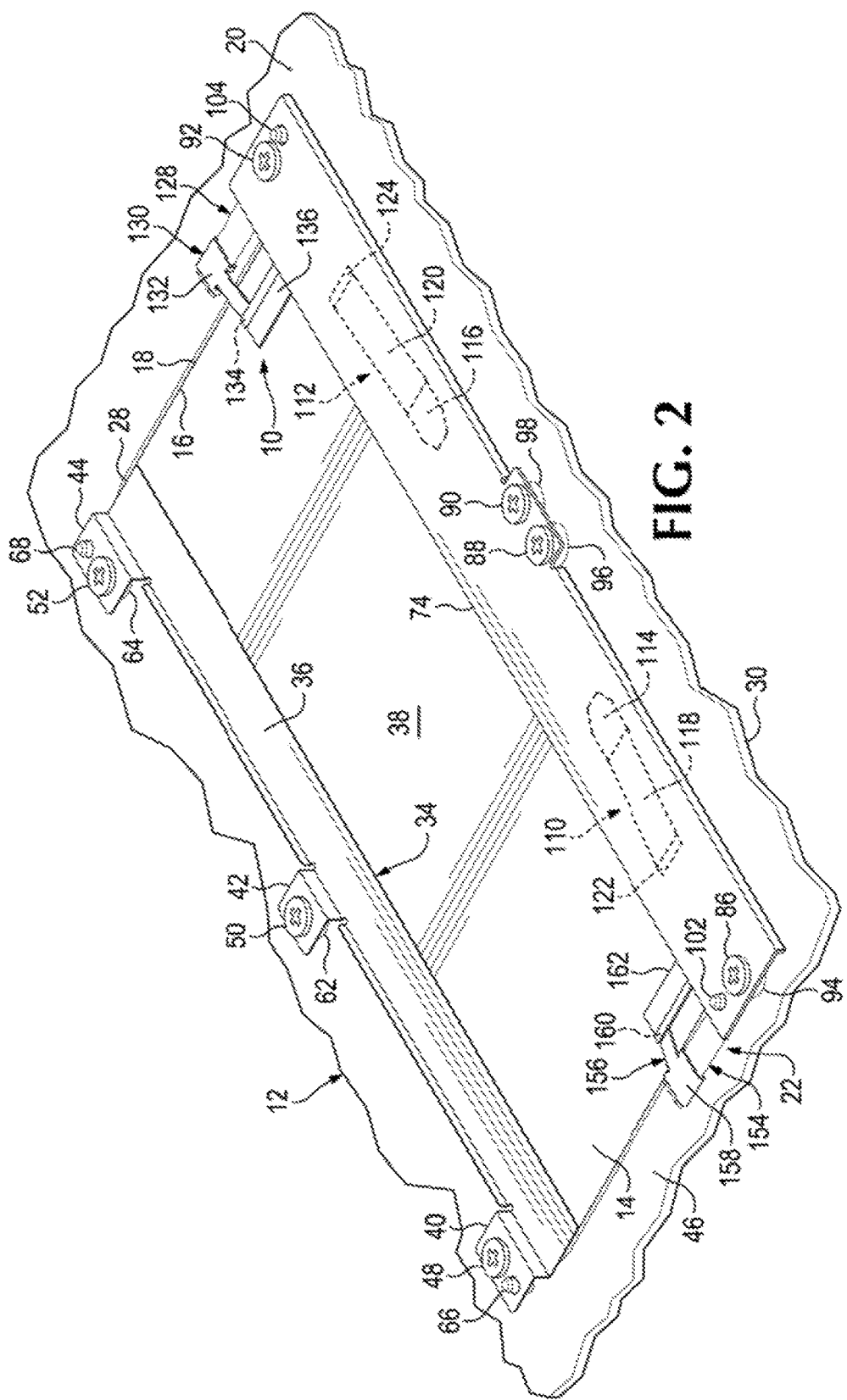
FIG. 2 is an enlarged view of an example of the apparatus to use in an electronic device of FIG. 1.
Figure 3:
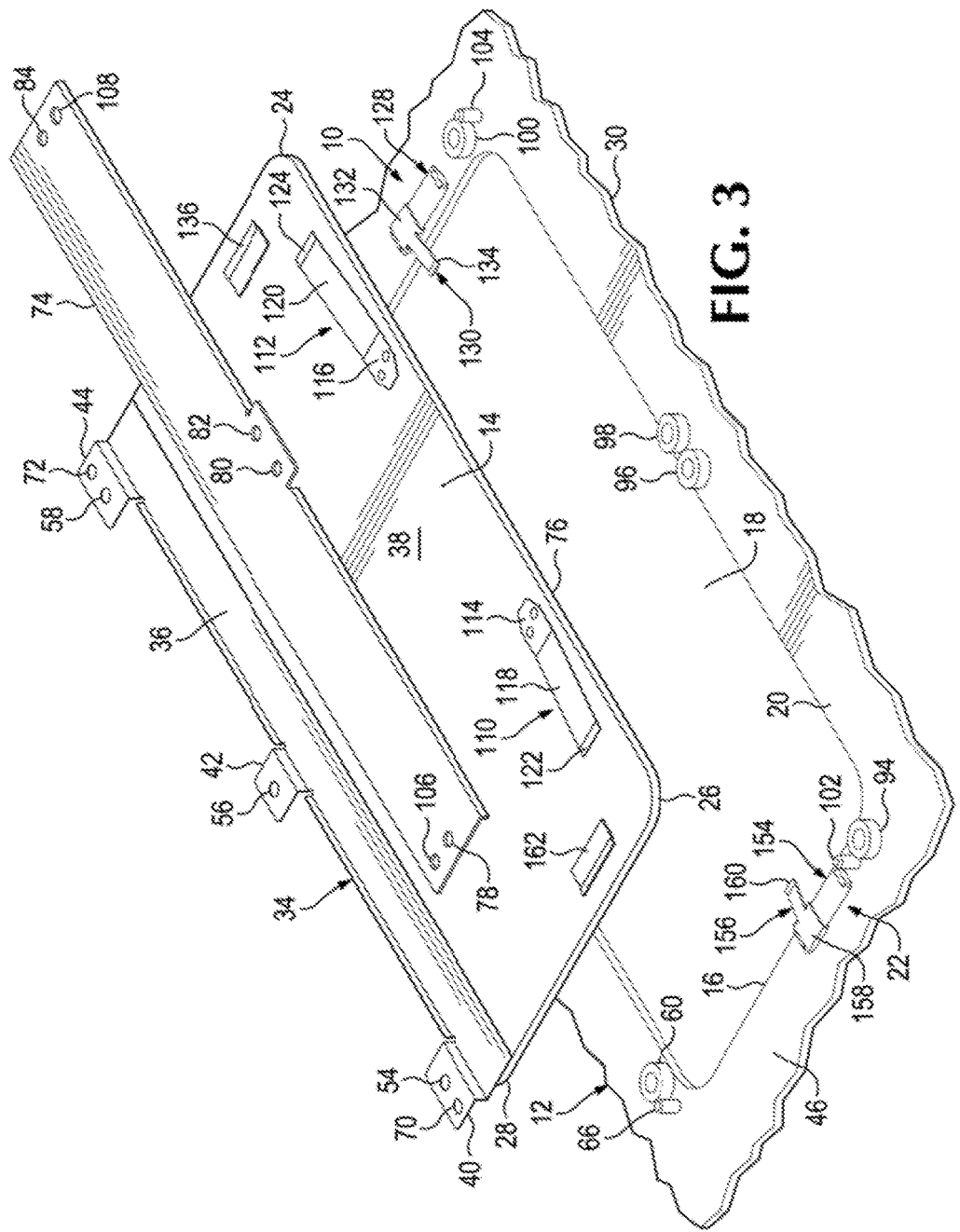
FIG. 3 is an example of an exploded view of the apparatus to use in an electronic device of FIG. 2.

An enlarged view of an example of apparatus 10 to use in electronic device 12 is shown in FIG. 2. An example of an exploded view of apparatus 10 to use in electronic device 12 is shown in FIG. 3. As can be seen in FIG. 2, apparatus 10 also includes a bracket 34 to secure first side 28 of touch pad 14 to housing 20 adjacent edge 16. Bracket 34 includes a portion 36 that extends across and is attached to back surface 38 of touch pad 14. Bracket 34 also includes mounting flanges 40, 42, and 44 to secure bracket 34 to back surface 46 of housing 20 via fasteners 48, 50, and 52 that are disposed in openings 54, 56, and 58 (see FIG. 3) defined by respective mounting flanges 40, 42, and 44 that are received in respective bosses 60, 62, and 64 (see FIGS. 2 and 3) of housing 20. Housing 20 includes guide pins 66 and 68 that are disposed in respective openings 70 and 72 (see FIG. 3) of respective mounting flanges 40 and 42 to help orient bracket 34 with respect to back surface 46 of housing 20. Bracket 34 creates a hinge that allows respective first and second corners 24 and 26 to move in either a direction toward or away from front surface 30 of housing 20 during selective movement thereof by adjustment mechanism 22, as discussed more fully below.

As can also be seen in FIG. 2, apparatus 10 may also include a bracket 74 to help secure second side 76 (see FIG.

3) of touch pad 14 to housing 20 adjacent edge 16. As can be seen in FIGS. 2 and 3, bracket 74 includes a plurality of openings 78, 80, 82, and 84 through which respective fasteners 86, 88, 90, and 92 are disposed into respective bosses 94, 96, 98, and 100. This helps to secure bracket 74 to back surface 46 of housing 20, as shown in FIG. 2. Housing 20 includes guide pins 102 and 104 that are disposed in respective openings 106 and 108 (see FIG. 3) of bracket 74 to help orient bracket 74 which respect to back surface 46 of housing 20.

As can be seen in FIGS. 2 and 3, apparatus 10 may include a pair of biasing members 110 and 112 that are attached at respective ends 114 and 116 to back surface 38 of touch pad 14. In the examples shown in FIGS. 2 and 3, biasing members 110 and 112 include respective leaf springs 118 and 120 with respective ends 122 and 124 that are angled toward bracket 74 so as to be in contact with bracket 74 when bracket 74 is secured to back surface 46 of housing 20, as shown in FIG. 2. This contact of ends 122 and 124 with bracket 74 compresses respective leaf springs 118 and 120 of respective biasing members 110 and 112 which generally urges touch pad 14 toward front surface 30 of housing 20.

Figure 4:
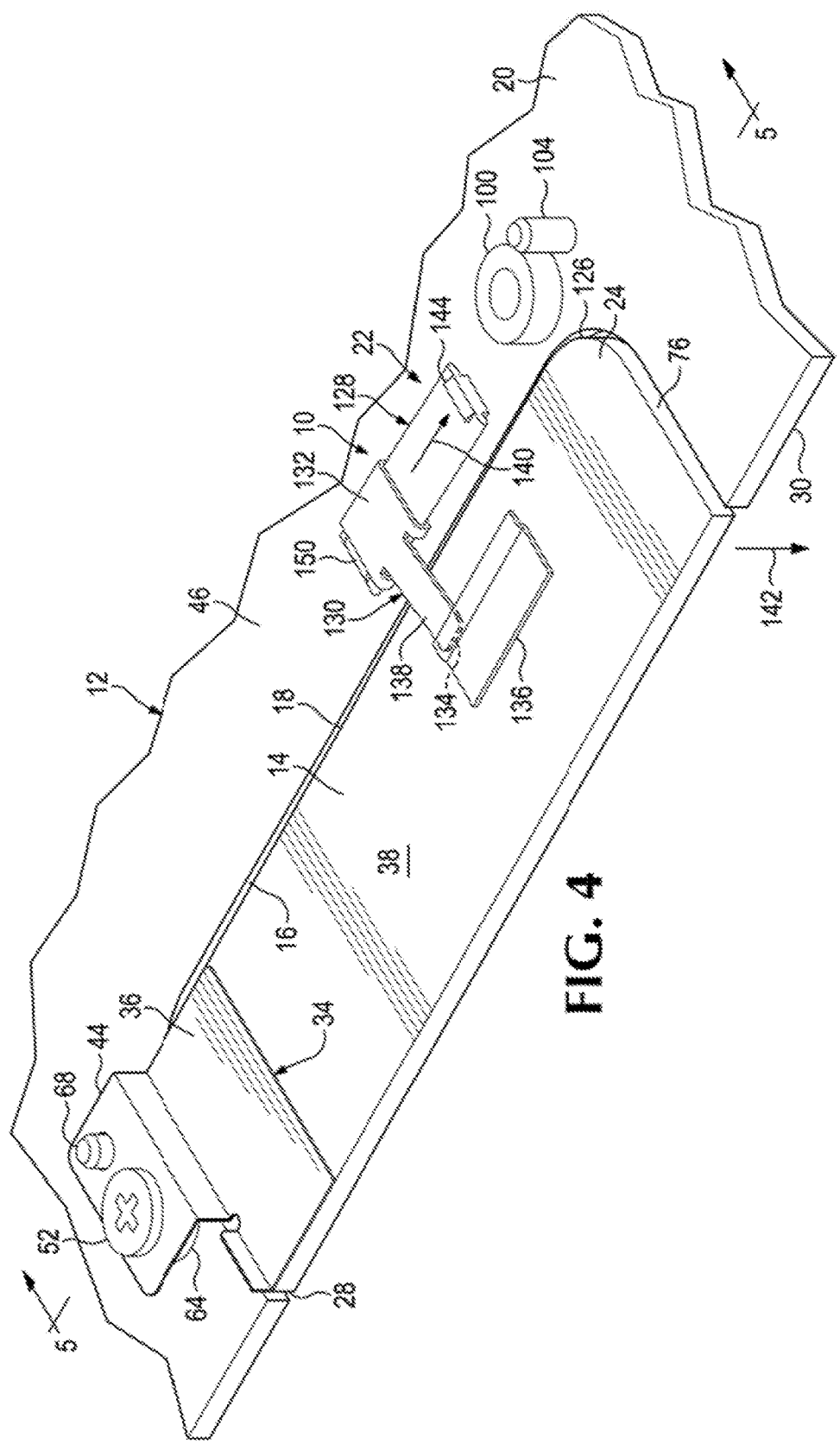
FIG. 4 is an example of a step between a first corner of a touch pad and an adjacent edge of a housing of an electronic device.
Figure 5:
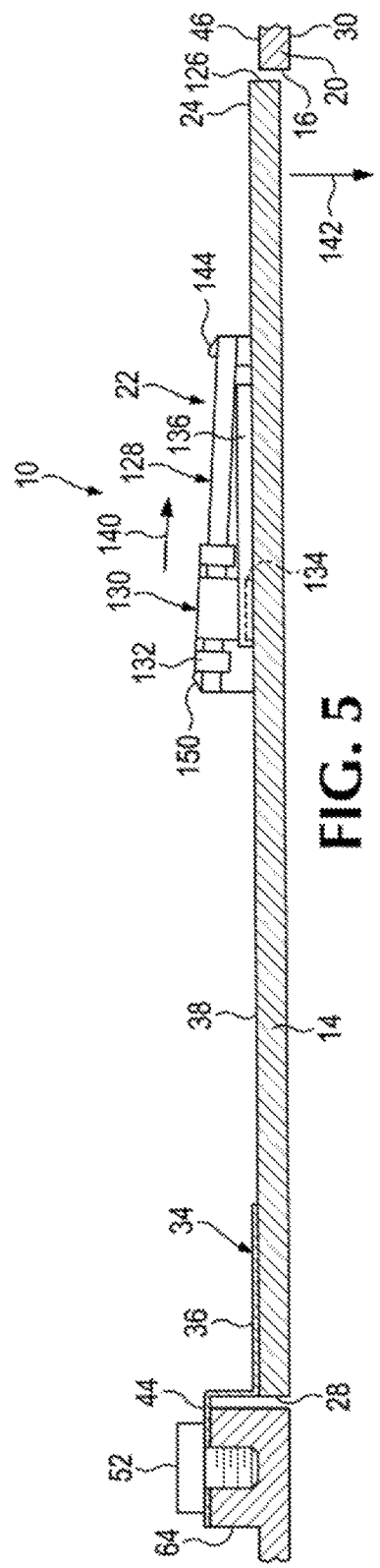
FIG. 5 is an example of a cross-sectional view taken along line 5-5 of FIG. 4 of a step between a first corner of a touch pad and an adjacent edge of a housing of an electronic device.

An example of a step 126 between first corner 24 of touch pad 14 and adjacent edge 16 of housing 20 of electronic device 12 is shown in FIG. 4. An example of a cross-sectional view of step 126 between first corner 24 of touch pad 14 and an adjacent edge 16 of housing 20 of electronic device 12 taken along line 5-5 of FIG. 4 is shown in FIG. 5. As can be seen in FIGS. 4 and 5, adjustment mechanism 22 includes a first ramp 128 on back surface 46 of housing 20 adjacent edge 16 of opening 18 defined by housing 20. First ramp 128 has an incline that increases in a direction away from first corner 24 of touch pad 14. As can also be seen in FIGS. 4 and 5, adjustment mechanism 22 includes a first shim 130 having a first end 132 slideably coupled to first ramp 128 and a second end 134 slideably coupled to touch pad 14. As can additionally be seen in FIGS. 4 and 5, in this example, adjustment mechanism 22 also includes a first holder plate 136 on back surface 38 of touch pad 14 in which second end 134 of first shim 130 is slideably disposed. In the example shown in FIGS. 4 and 5, first shim 130 includes a first biasing member 138 in the form of a leaf spring.

Figure 6:
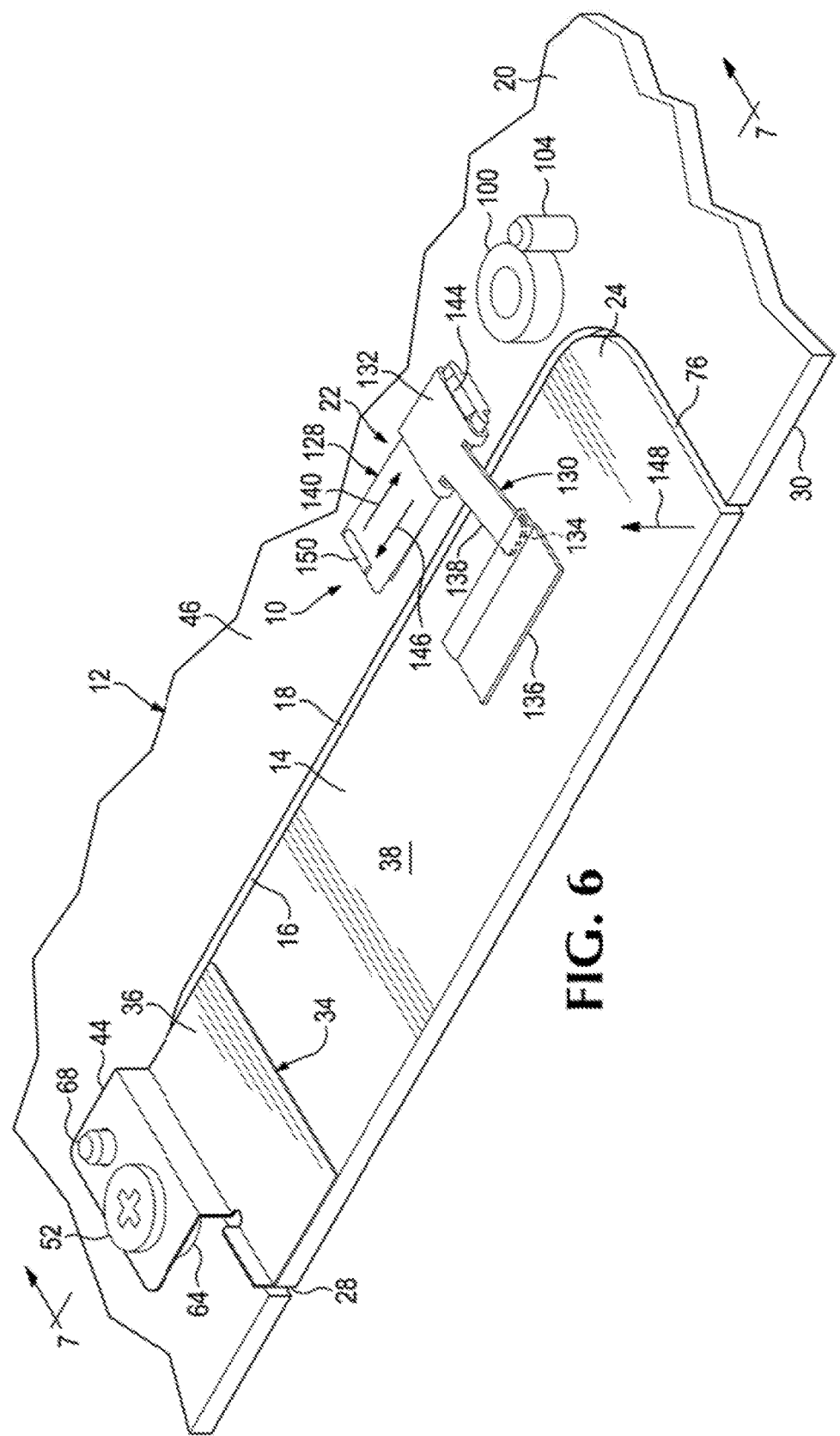
FIG. 6 is an example of a first corner of a touch pad and an adjacent edge of a housing of an electronic device being substantially flush.
Figure 7:
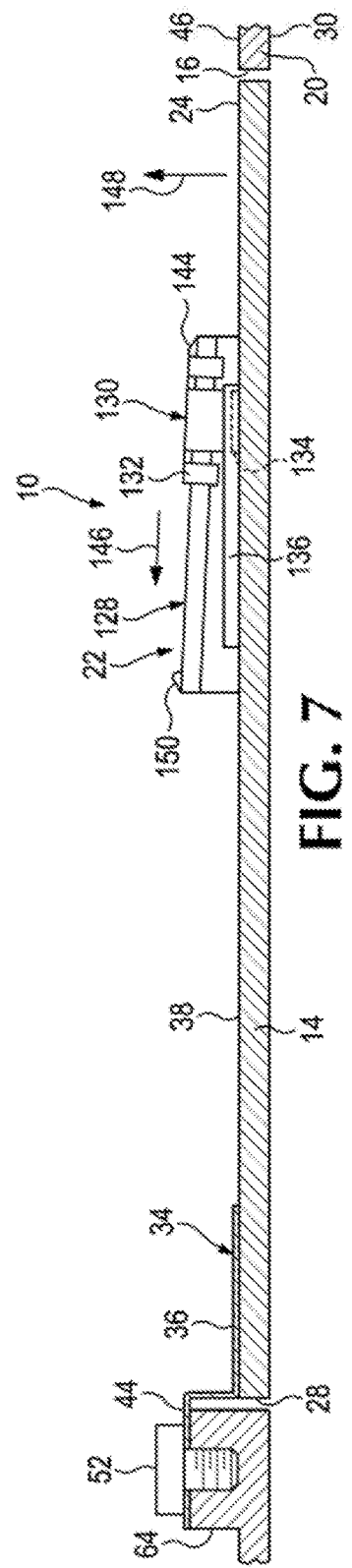
FIG. 7 is an example of a cross-sectional view taken along line 7-7 of FIG. 6 of a first corner of a touch pad and an adjacent edge of a housing of an electronic device being substantially flush.

Step 126 may be minimized by movement of first shim 130 along first ramp 128 in a first direction, indicated by arrow 140 in FIGS. 4 and 5, which causes first corner 24 of touch pad 14 to move toward front surface 30 of housing 20 of electronic device 12, as indicated by arrow 142. This movement of first shim 130 along first ramp 128 in first direction 140 and first corner 24 toward front surface 30 of housing 20 in the direction of arrow 142 eventually results in first corner 24 of touch pad 14 and adjacent edge 16 of housing 20 of electronic device 12 becoming substantially flush, as shown in FIGS. 6 and 7. As can be seen in FIGS. 6 and 7, first ramp 128 includes a first stop 144 that limits movement of first shim 130 in first direction 140.

As can also be seen in FIGS. 6 and 7, first shim 130 may also be moved along first ramp 128 in a second direction, indicated by arrow 146, which causes first corner 24 of touch pad 14 to move away from front surface 30 of housing 20 in the direction of arrow 148. These movements may be helpful to address a different type of step between first corner 24 of touch pad 14 and adjacent edge 16 of housing 20 of electronic device 12 of the type illustrated and discussed below with respect to second corner 26. First ramp 128 also includes a second stop 150 that limits movement of first shim 130 in second direction 146.

Figure 8:
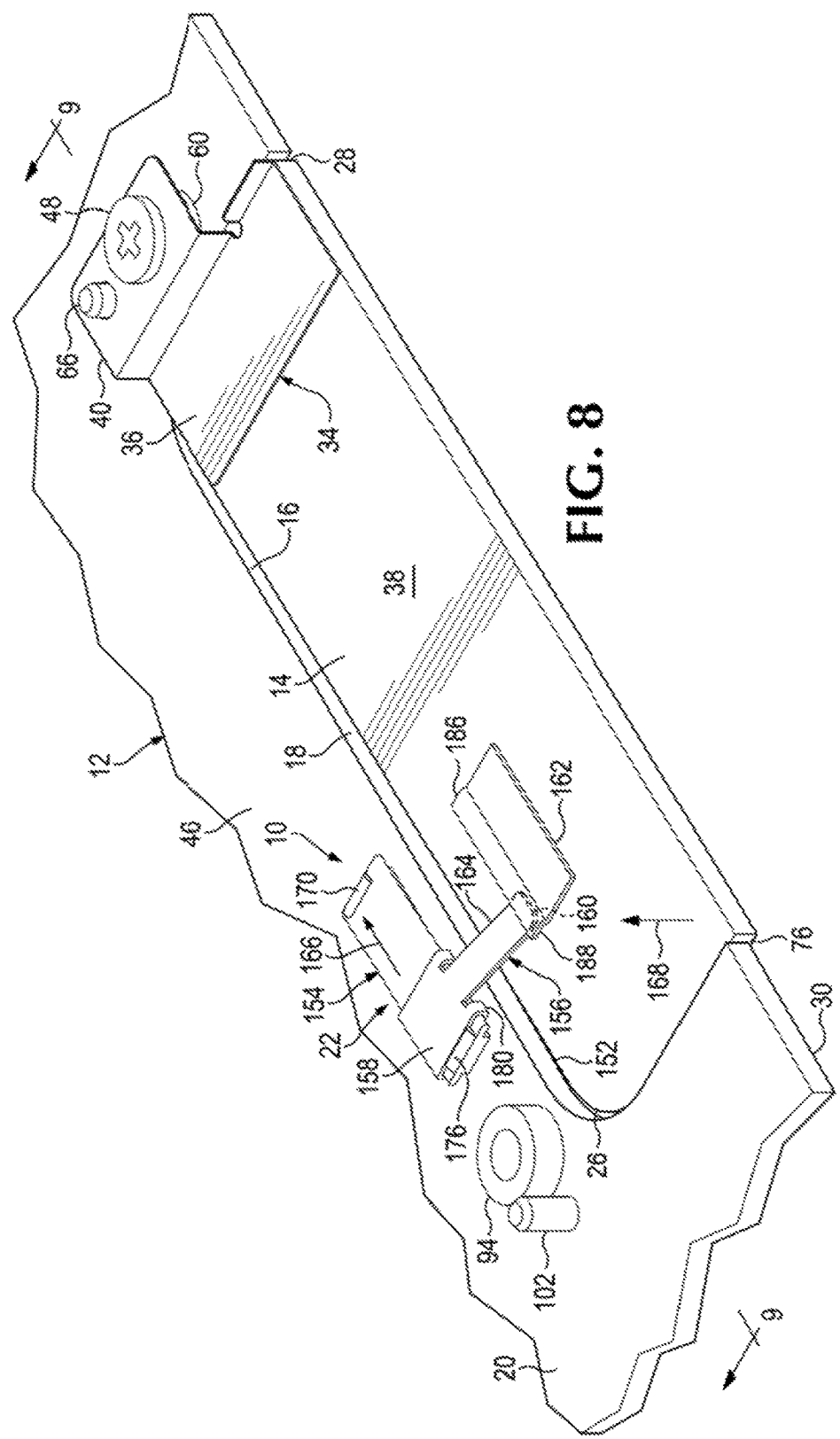
FIG. 8 is an example of a step between a second corner of a touch pad and an adjacent edge of a housing of an electronic device.
Figure 9:
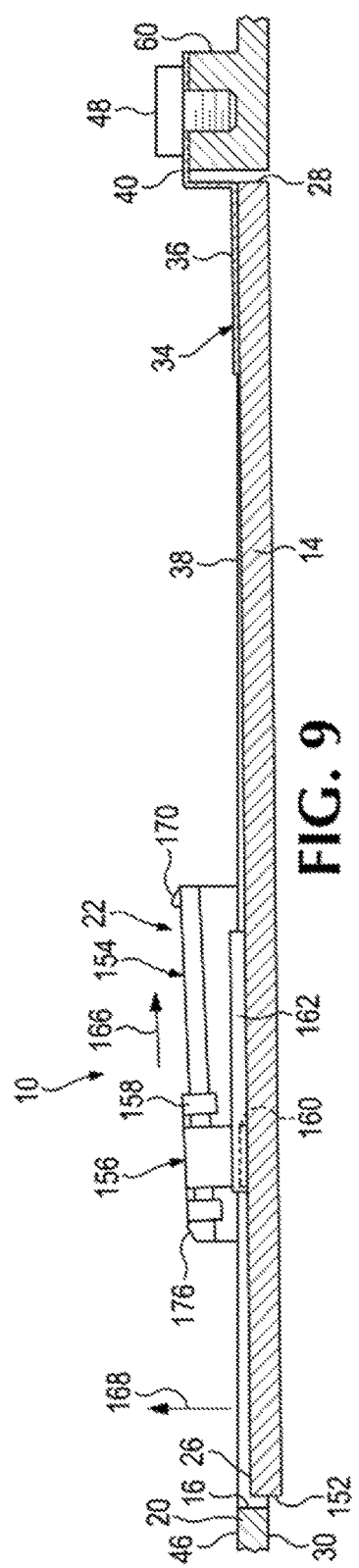
FIG. 9 is an example of a cross-sectional view taken along line 9-9 of FIG. 8 of a step between a second corner of a touch pad and an adjacent edge of a housing of an electronic device.

An example of a step 152 between second corner 26 of touch pad 14 and adjacent edge 16 of housing 20 of electronic device 12 is shown in FIG. 8. An example of a cross-sectional view of step 152 between second corner 26 of touch pad 14 and an adjacent edge 16 of housing 20 of electronic device 12 taken along line 9-9 of FIG. 8 is shown in FIG. 9. As can be seen in FIGS. 8 and 9, adjustment mechanism 22 includes a second ramp 154 on back surface 46 of housing 20 adjacent edge 16 of opening 18 defined by housing 20. Second ramp 154 has an incline that increases in a direction away from second corner 26 of touch pad 14. As can also be seen in FIGS. 8 and 9, adjustment mechanism 22 includes a second shim 156 having a first end 158 slideably coupled to second ramp 154 and a second end 160 slideably coupled to touch pad 14. As can additionally be seen in FIGS. 8 and 9, in this example, adjustment mechanism 22 also includes a second holder plate 162 on back surface 38 of touch pad 14 in which second end 160 of second shim 156 is slideably disposed. In the example shown in FIGS. 8 and 9, second shim 156 includes a second biasing member 164 in the form of a leaf spring.

Figure 10:
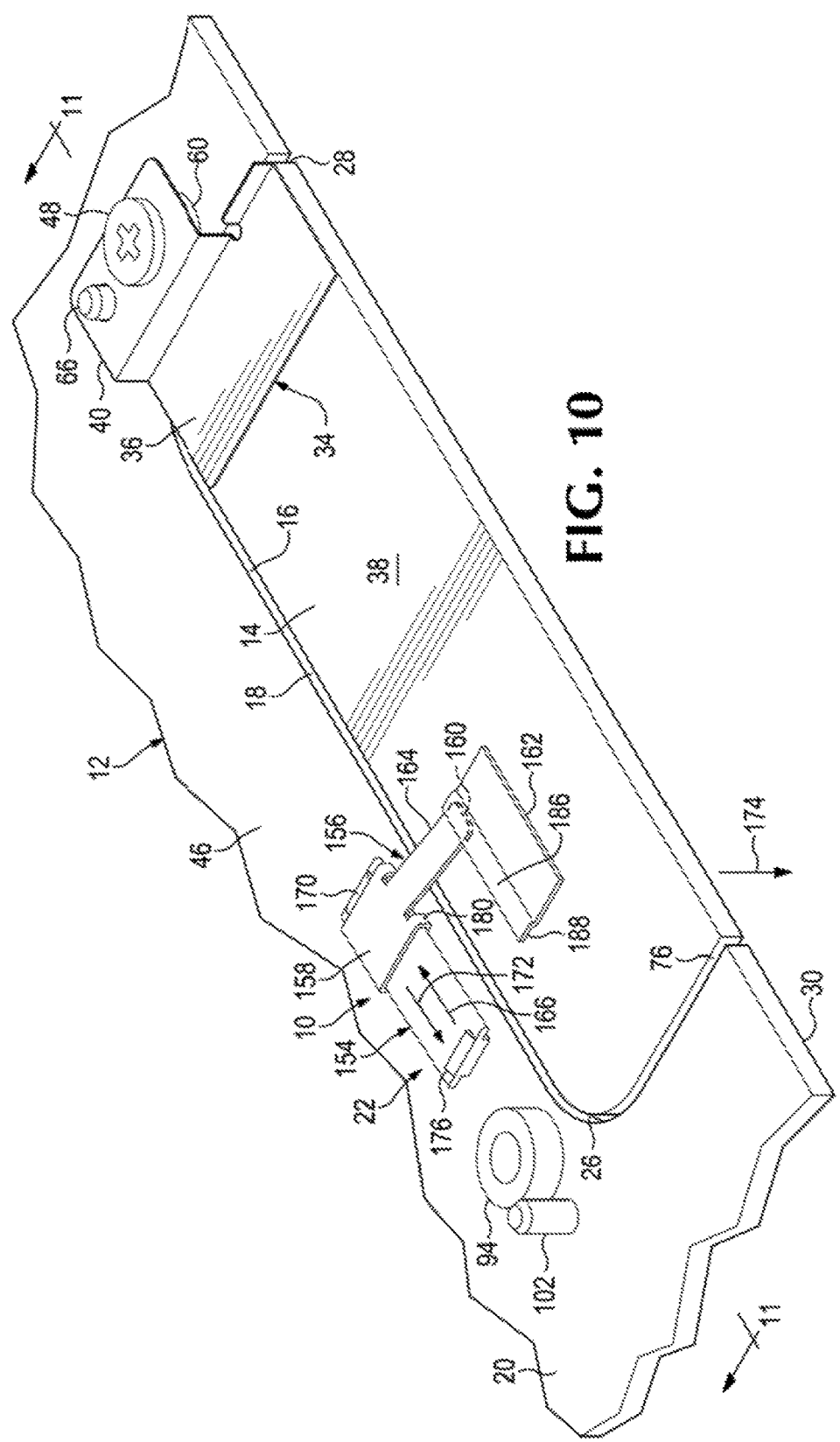
FIG. 10 is an example of a second corner of a touch pad and an adjacent edge of a housing of an electronic device being substantially flush.
Figure 11:
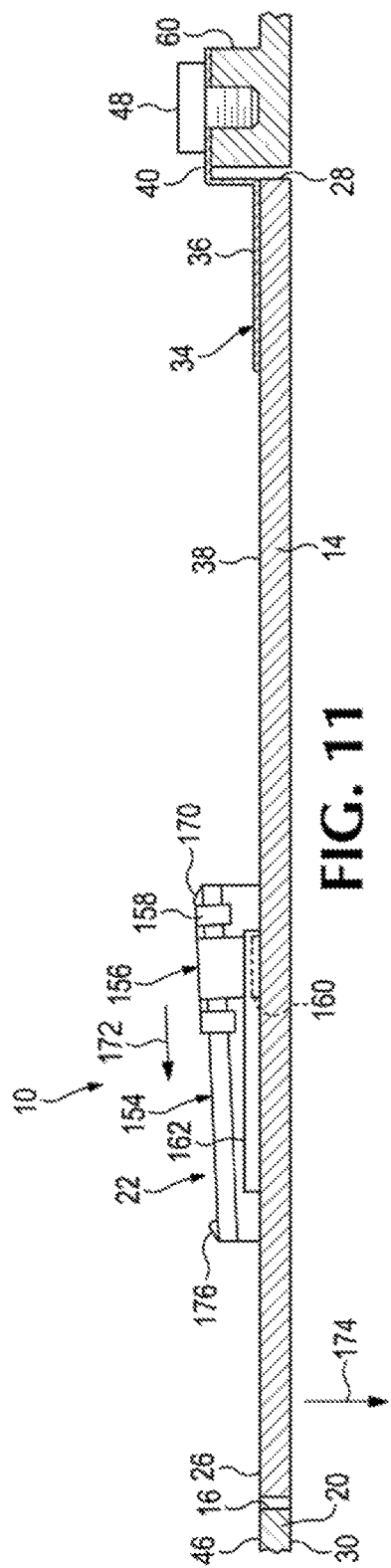
FIG. 11 is an example of a cross-sectional view taken along line 11-11 of FIG. 10 of a second corner of a touch pad and an adjacent edge of a housing of an electronic device being substantially flush.

Step 152 may be minimized by movement of second shim 156 along second ramp 154 in a third direction, indicated by arrow 166 in FIGS. 8 and 9, which causes second corner 26 of touch pad 14 to move away from front surface 30 of housing 20 of electronic device 12, as indicated by arrow 168. This movement of second shim 156 along second ramp 154 in third direction 166 and second corner 26 away from front surface 30 of housing 20 in the direction of arrow 168 eventually results in second corner 26 of touch pad 14 and adjacent edge 16 of housing 20 of electronic device 12 becoming substantially flush, as shown in FIGS. 10 and 11. As can be seen in FIGS. 10 and 11, second ramp 154 includes a third stop 170 that limits movement of second shim 156 in third direction 166.

As can also be seen in FIGS. 10 and 11, second shim 156 may also be moved along second ramp 154 in a fourth direction, indicated by arrow 172, which causes second corner 26 of touch pad 14 to move toward front surface 30 of housing 20 in the direction of arrow 174. These movements may be helpful to address a different type of step between second corner 26 of touch pad 14 and adjacent edge 16 of housing 20 of electronic device 12 of the type illustrated and discussed above with respect to first corner 24. Second ramp 154 also includes a fourth stop 176 that limits movement of second shim 156 in fourth direction 172.

Figure 12:
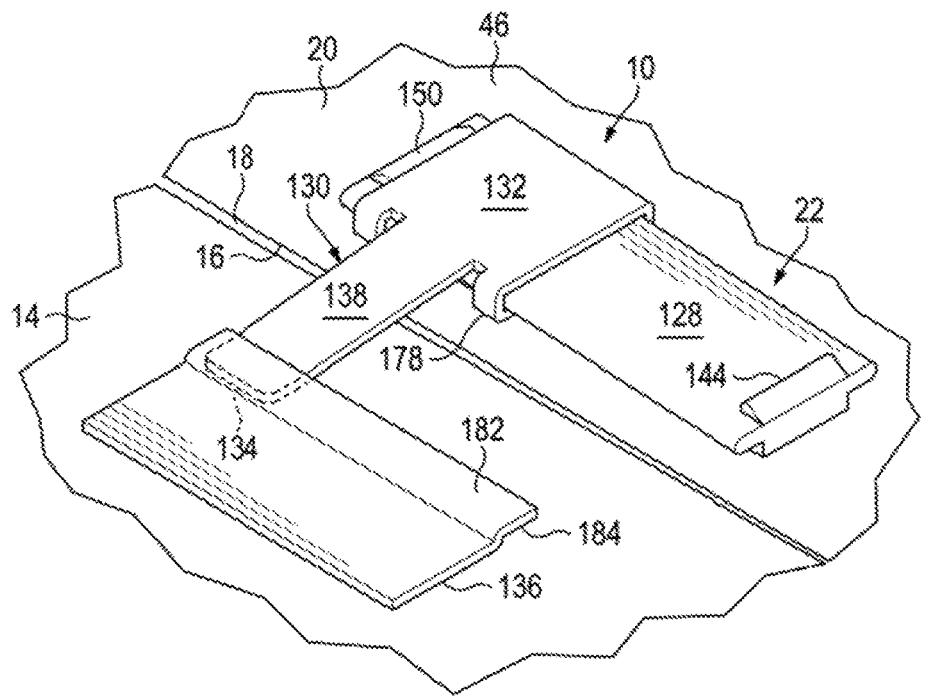
FIG. 12 is an example of an enlarged view of an adjustment mechanism.
Figure 13:
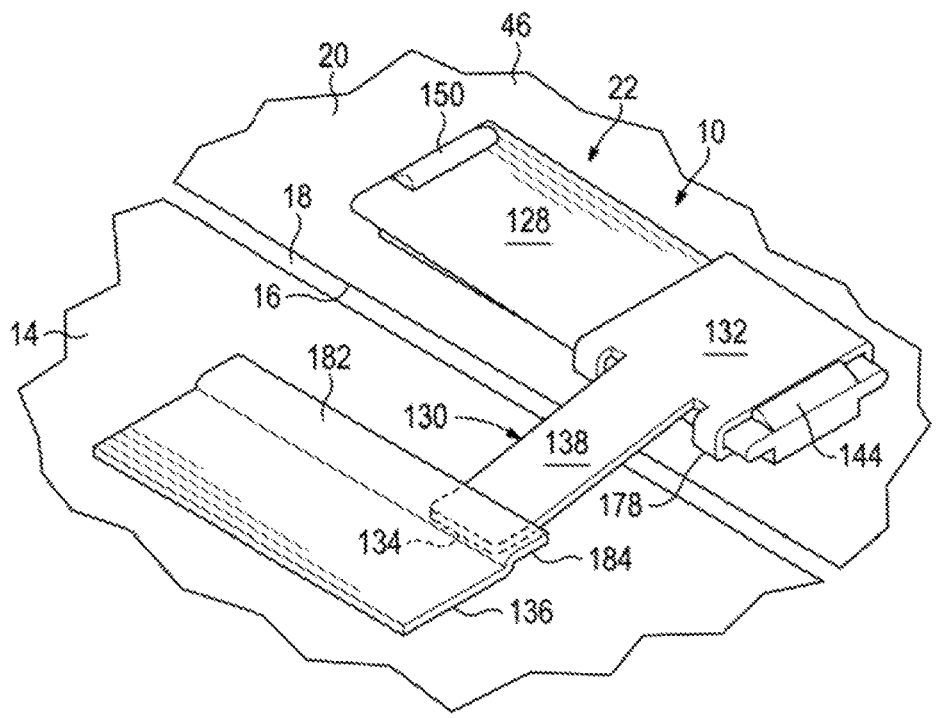
FIG. 13 is another example of an enlarged view of an adjustment mechanism.

Examples of an enlarged view of adjustment mechanism 22 are shown in FIGS. 12 and 13. As can be seen in FIGS. 12 and 13, first end 132 of first shim 130 includes a clip 178 that slideable couples to first ramp 128 to permit first end 132 of first shim 132 to move along first ramp 128 anywhere between the two positions shown in FIGS. 12 and 13. First end 158 of second shim 156 also includes a clip 180 (see, e.g., FIGS. 8 and 10) that slideably couples to second ramp 154 to permit first end 158 of second shim 156 to move along second ramp 154 anywhere between the two positions shown, for example, in FIGS. 8 and 10.

Referring again to FIGS. 12 and 13, first holder plate 136 includes a raised portion 182 that defines a cavity 184 between touch pad 14 and raised portion 182 into which second end 134 of first shim 130 is slideably disposed to slideably couple first shim 130 to touch pad 14 to permit second end 134 of first shim 130 to move any where between the two positions shown in FIGS. 12 and 13. Second holder plate 162 also includes a raised portion 186 (see, e.g., FIGS. 8 and 10) into which second end 160 of second shim 156 is slideably deposed to slideably couple second shim 156 to touch pad 14 to permit second end 160 of second shim 156 to move anywhere between the two positions shown, for example, in FIGS. 8 and 10.

Figure 14:
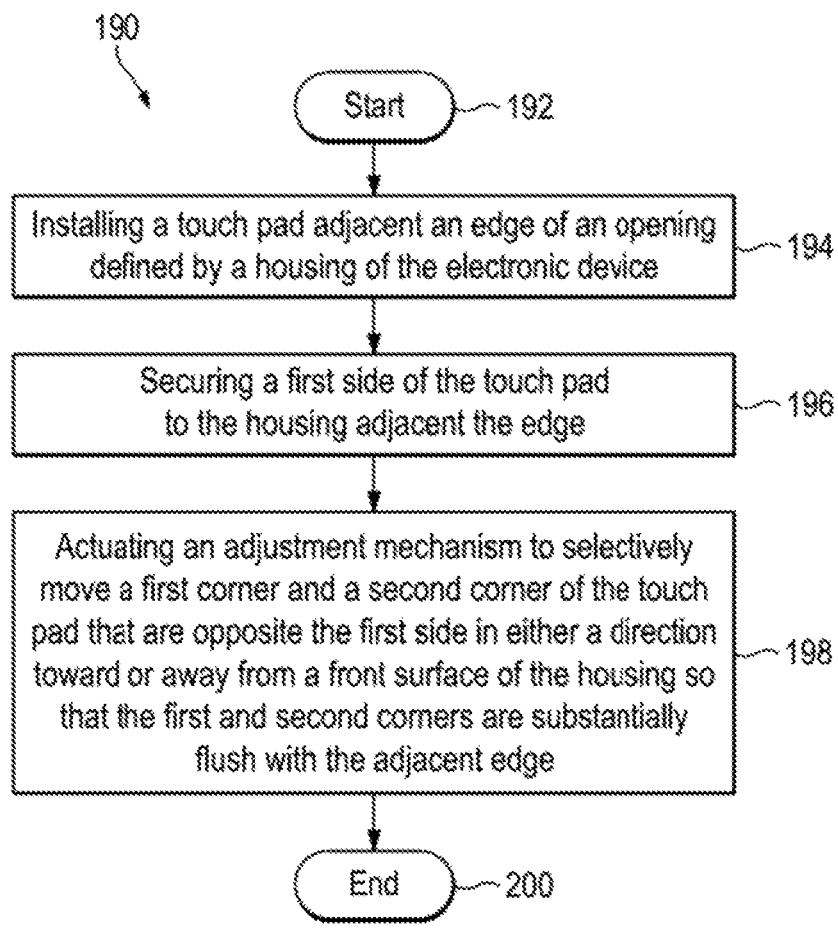
FIG. 14 is an example of a method to use in an electronic device.

An example of a method 190 to use in an electronic device is shown in FIG. 14. As can be seen in FIG. 14, method 190 starts 192 by installing a touch pad adjacent an edge of an opening defined by a housing of the electronic device, as indicated by block 194, and securing a first side of the touch pad to the housing adjacent the edge, as indicated by block 196. Method 190 continues by actuating an adjustment mechanism to selectively move a first corner and a second corner of the touch pad that are opposite the first side in either a direction toward or away from a front surface of the housing so that the first and second corners are substantially flush with the adjacent edge, as indicated by block 198. Method 190 may then end 200.

Although several drawings have been described and illustrated in detail, it is to be understood that the same are intended by way of illustration and example. These examples are not intended to be exhaustive or to be limited to the precise form disclosed. Modifications and variations may well be apparent.

Additionally, reference to an element in the singular is not intended to mean one, unless explicitly so stated. Furthermore, unless specifically stated, any method elements are not limited to the sequence or order described and illustrated. Moreover, no element or component is intended to be dedicated to the public regardless of whether the element or component is explicitly recited in the following claims.

What is claimed is:

1. An apparatus comprising:
   a touch pad adjacent an edge of an opening defined by a housing of an electronic device, wherein the touch pad comprises a first corner and a second corner;
   a bracket to secure a first side of the touch pad to the housing adjacent the edge, wherein the first corner and the second corner are opposite the first side of the touch pad; and
   an adjustment mechanism to adjust a mounting of the touch pad relative to a front surface of the housing, wherein the adjustment mechanism comprises:
      a first part to selectively adjust the mounting of the touch pad to move the first corner of the touch pad toward or away from the front surface of the housing so that the first corner is substantially flush with the front surface of the housing; and
      a second part to, independently from the movement of the first corner of the touch pad, selectively adjust the mounting of the touch pad to move the second corner of the touch pad toward or away from the front surface of the housing so that the second corner is substantially flush with the front surface of the housing.

2. The apparatus of claim 1, wherein the bracket creates a hinge to allow the movement of the first corner of the touch pad and to allow the movement of the second corner of the touch pad.

3. The apparatus of claim 1, wherein the adjustment mechanism is adjacent a back surface of the housing.

4. The apparatus of claim 1, wherein the adjustment mechanism includes a first ramp on a back surface of the housing adjacent the edge and a second ramp on the back surface of the housing adjacent the edge.

5. The apparatus of claim 4, wherein the adjustment mechanism also includes a first shim having a first end slideably coupled to the first ramp and a second end slideably coupled to the touch pad and a second shim having a first end slideably coupled to the second ramp and a second end slideably coupled to the touch pad.

6. The apparatus of claim 5, wherein movement of the first end of the first shim along the first ramp in a first direction causes the first corner to move toward the front surface of the housing and movement of the first end of the first shim along the first ramp in a second direction causes the first corner to move away from the front surface of the housing, and further wherein movement of the first end of the second shim along the second ramp in a third direction causes the second corner to move away from the front surface of the housing and movement of the first end of the second shim along the second ramp in a fourth direction causes the second corner to move toward the front surface of the housing.

7. The apparatus of claim 5, wherein an incline of the first ramp increases in a direction away from the first corner and an incline of the second ramp increases in a direction away from the second corner.

8. The apparatus of claim 5, wherein the adjustment mechanism additionally includes a first holder plate on a back surface of the touch pad in which the second end of the first shim is slideably disposed and a second holder plate on the back surface of the touch pad in which the second end of second shim is slideably disposed.

9. An adjustment mechanism comprising:
   a first ramp;
   a second ramp;
   a first shim slideably coupled to the first ramp and a touch pad of an electronic device so that movement of the first shim along the first ramp in a first direction causes a first corner of the touch pad to move toward a front surface of a housing of the electronic device and movement of the first shim along the first ramp in a second direction causes the first corner to move away from the front surface of the housing, wherein an incline of the first ramp increases in the second direction; and
   a second shim slideably coupled to the second ramp and the touch pad so that movement of the second shim along the second ramp in a third direction causes a second corner of the touch pad to move away from the front surface of the housing and movement of the second shim along the second ramp in a fourth direction causes the second corner to move toward the front surface of the housing, wherein an incline of the second ramp increases in the fourth direction.

10. The adjustment mechanism of claim 9, wherein the first ramp includes a first stop to limit movement of the first shim in the first direction and a second stop to limit movement of the first shim in the second direction, and further wherein the second ramp includes a third stop to limit movement of the second shim in the third direction and a fourth stop to limit movement of the second shim in the fourth direction.

11. The adjustment mechanism of claim 9, wherein the first ramp and the second ramp are on a back surface of the housing.

12. The adjustment mechanism of claim 9, further comprising:
   a first holder plate on a back surface of the touch pad to slideably couple the first shim to the touch pad; and
   a second holder plate on the back surface of the touch pad to slideably couple the second shim to the touch pad.

13. The adjustment mechanism of claim 9, wherein the first shim includes a first biasing member having a first end slideably coupled to the first ramp and a second end slideably coupled to the touch pad, and further wherein the second shim includes a second biasing member having a first end slideably coupled to the second ramp and a second end slideably coupled to the touch pad.

14. A method comprising:
- installing a touch pad of an electronic device adjacent an edge of an opening defined by a housing of the electronic device, wherein the touch pad comprises a first corner and a second corner;
- securing a first side of the touch pad to the housing adjacent the edge, wherein the first corner and the second corner are opposite the first side of the touch pad; and
- actuating an adjustment mechanism to adjust a mounting of the touch pad to cause the first and second corners to be substantially flush with the adjacent edge of the opening defined by the housing of the electronic device, wherein adjusting the adjustment mechanism comprises:
  - selectively actuating a first part of the adjustment mechanism to move the first corner of the touch pad toward or away from the first surface of the housing so that the first corner of the touch pad is substantially flush with the adjacent edge of the opening; and
  - selectively actuating a second part of the adjustment mechanism to, independently from the movement of the first corner of the touch pad, move the second corner of the touch pad toward or away from the front surface of the housing to cause the second corner to be substantially flush with the adjacent edge of the opening.

* * * * *

UNITED STATES PATENT AND TRADEMARK OFFICE
CERTIFICATE OF CORRECTION

PATENT NO.        : 10,234,967 B2
APPLICATION NO.   : 15/516461
DATED             : March 19, 2019
INVENTOR(S)       : Chin-Hung Huang Page 1 of 1

It is certified that error appears in the above-identified patent and that said Letters Patent is hereby corrected as shown below:

On the Title Page

In Column 2, item (57), Abstract, Line 10, delete "will" and insert -- with --, therefor.

Signed and Sealed this
Twenty-fifth Day of June, 2019

Andrei Iancu
*Director of the United States Patent and Trademark Office*